(12) United States Patent
Colletti et al.

(10) Patent No.: US 10,190,698 B2
(45) Date of Patent: Jan. 29, 2019

(54) SOLENOID VALVES FOR HIGH VIBRATION ENVIRONMENTS

(71) Applicant: Marotta Controls, Inc., Montville, NJ (US)

(72) Inventors: Alexander Colletti, Montville, NJ (US); Brian Ippolitto, Montville, NJ (US); James LaGrotta, Montville, NJ (US); Christian Skawski, Montville, NJ (US); Christopher Strianse, Montville, NJ (US); Maxwell Wolfinger, Montville, NJ (US)

(73) Assignee: Marotta Controls, Inc., Montville, NJ (US)

(*) Notice: Subject to any disclaimer, the term of this patent is extended or adjusted under 35 U.S.C. 154(b) by 0 days.

(21) Appl. No.: 15/426,442

(22) Filed: Feb. 7, 2017

(65) Prior Publication Data

US 2018/0224014 A1  Aug. 9, 2018

(51) Int. Cl.
  *F16K 27/04* (2006.01)
  *F16K 11/07* (2006.01)
  *F16K 47/00* (2006.01)
  *F16K 31/06* (2006.01)

(52) U.S. Cl.
  CPC ........ *F16K 27/041* (2013.01); *F16K 11/0716* (2013.01); *F16K 31/0613* (2013.01); *F16K 47/00* (2013.01)

(58) Field of Classification Search
  CPC .. F16K 11/0716; F16K 27/041; F16K 27/048; F16K 31/0613; F16K 47/00

USPC ..................................................... 251/129.16
See application file for complete search history.

(56) References Cited

U.S. PATENT DOCUMENTS

| | | | | |
|---|---|---|---|---|
| 2,934,315 A | * | 4/1960 | Kenann | F16K 1/42 251/362 |
| 4,021,152 A | * | 5/1977 | Toyoda | F04B 17/042 251/129.15 |
| 4,127,835 A | * | 11/1978 | Knutson | H01F 7/1615 310/30 |

(Continued)

FOREIGN PATENT DOCUMENTS

| | | | | |
|---|---|---|---|---|
| DE | 10332345 A1 | * | 8/2004 | ............. B60T 8/363 |
| DE | 102015120981 A1 | * | 1/2017 | ......... F16K 31/0606 |
| WO | WO 2011021730 A1 | * | 2/2011 | ......... F16K 31/0613 |

*Primary Examiner* — Seth W. Mackay-Smith
(74) *Attorney, Agent, or Firm* — Lerner, David, Littenberg, Krumholz & Mentlik, LLP

(57) ABSTRACT

A solenoid operated valve includes a valve block defining a valve lumen, a poppet slidably disposed within the valve lumen, a solenoid including a core defining a core lumen aligned with the valve lumen, and an armature assembly. The armature assembly includes an armature disc, an armature guide having a hollow cylindrical body defining an armature guide passage, and an armature stud disposed within the armature guide passage. The armature stud is in communication with the poppet so that axial movement of one is translated into axial movement of the other. The valve further includes a coil cover enclosing the solenoid, and a guard disposed to prevent contact between the armature assembly and an adjacent component of the valve. A method of assembling a solenoid operated valve includes placing a shim between the armature disc and the core, and pressurizing and energizing the valve.

23 Claims, 14 Drawing Sheets

(56) References Cited

U.S. PATENT DOCUMENTS

| | | | | |
|---|---|---|---|---|
| 5,004,440 A | * | 4/1991 | Suzuki | G05D 16/2013 137/625.65 |
| 5,076,326 A | * | 12/1991 | McCabe | F16K 31/0606 137/625.65 |
| 6,435,213 B2 | * | 8/2002 | Lou | F16K 31/0613 137/625.65 |
| 6,907,901 B2 | * | 6/2005 | Holmes | F16D 25/14 137/625.65 |
| 2002/0162593 A1 | * | 11/2002 | Arnold | F16K 31/0613 137/625.65 |
| 2006/0114089 A1 | * | 6/2006 | Schempp | F16K 31/0679 335/220 |
| 2008/0038126 A1 | * | 2/2008 | Berroth | F04D 13/14 417/420 |
| 2008/0257433 A1 | * | 10/2008 | Tsujimoto | F16K 31/0613 137/625.61 |
| 2011/0115587 A1 | * | 5/2011 | Ishibashi | H01F 7/081 335/255 |
| 2013/0062544 A1 | * | 3/2013 | Cheong | F16K 31/0613 251/129.15 |

* cited by examiner

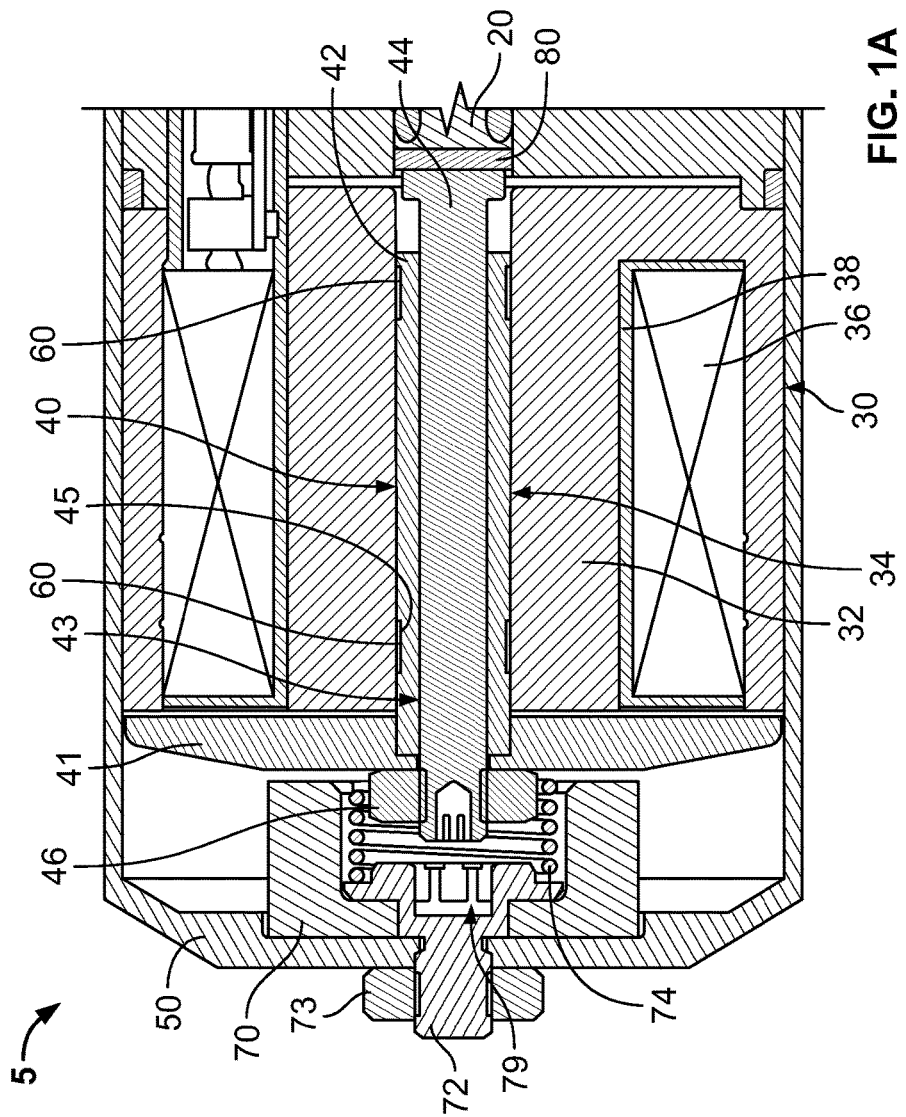

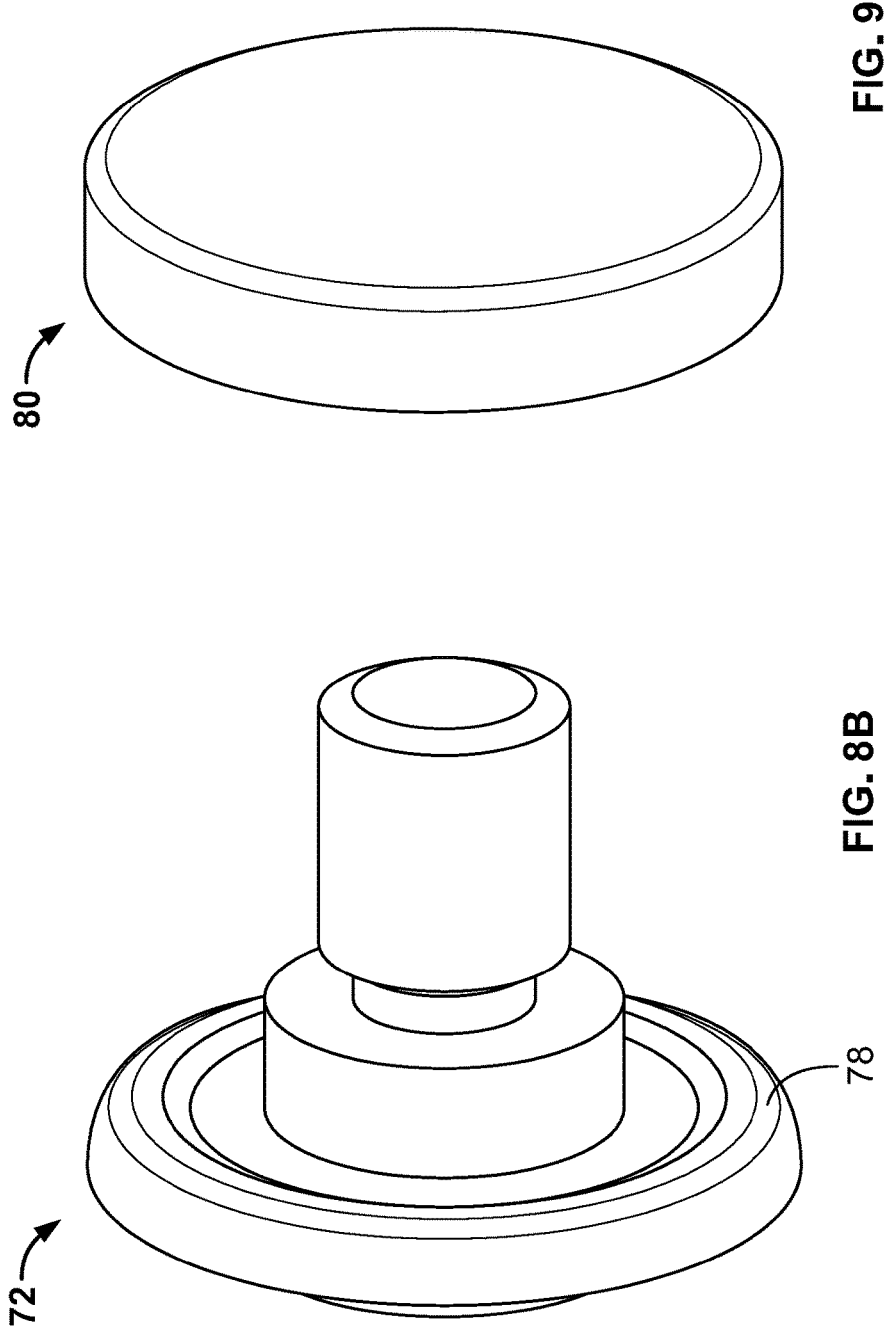

| Test | Configuration | Axis | gRMS (g) | Duration (Seconds) | Total Time without Failure @ High Vibration Environment (Seconds) |
|---|---|---|---|---|---|
| 1 | Solenoid Operated Valve without Guides | X | 112.84 | 110 | 220 |
| | | Y | 112.84 | 110 | (Failure due to Metal-Metal Wear on Stud/Poppet Interface) |
| | | Z | 155.01 | 110 Failure Occurred During Tset | |
| 2 | Solenoid Operated Valve Including Two Rings 60, Bumper 70, and Disc 80 | X(1) | 112.84 | 230 | 1550 |
| | | Y(1) | 112.84 | 230 | |
| | | Z(1) | 155.01 | 260 | |
| | | X(2) | 21.05 | 250 | |
| | | Y(2) | 21.05 | 250 | |
| | | Z(2) | 53.19 | 330 | |
| 3 | Solenoid Operated Valve Including Two Rings 60, Bumper 70, and Light Wave Spring 182 | X(1) | 112.84 | 230 | 1550 |
| | | Y(1) | 112.84 | 230 | |
| | | Z(1) | 155.01 | 260 | |
| | | X(2) | 21.05 | 250 | |
| | | Y(2) | 21.05 | 250 | |
| | | Z(2) | 53.19 | 330 | |
| 4 | Solenoid Operated Valve Including Two Rings 60, Bumper 70, and Cylinder 284 | X(1) | 112.84 | 230 | 1550 |
| | | Y(1) | 112.84 | 230 | |
| | | Z(1) | 155.01 | 260 | |
| | | X(2) | 21.05 | 250 | |
| | | Y(2) | 21.05 | 250 | |
| | | Z(2) | 53.19 | 330 | |

FIG. 13

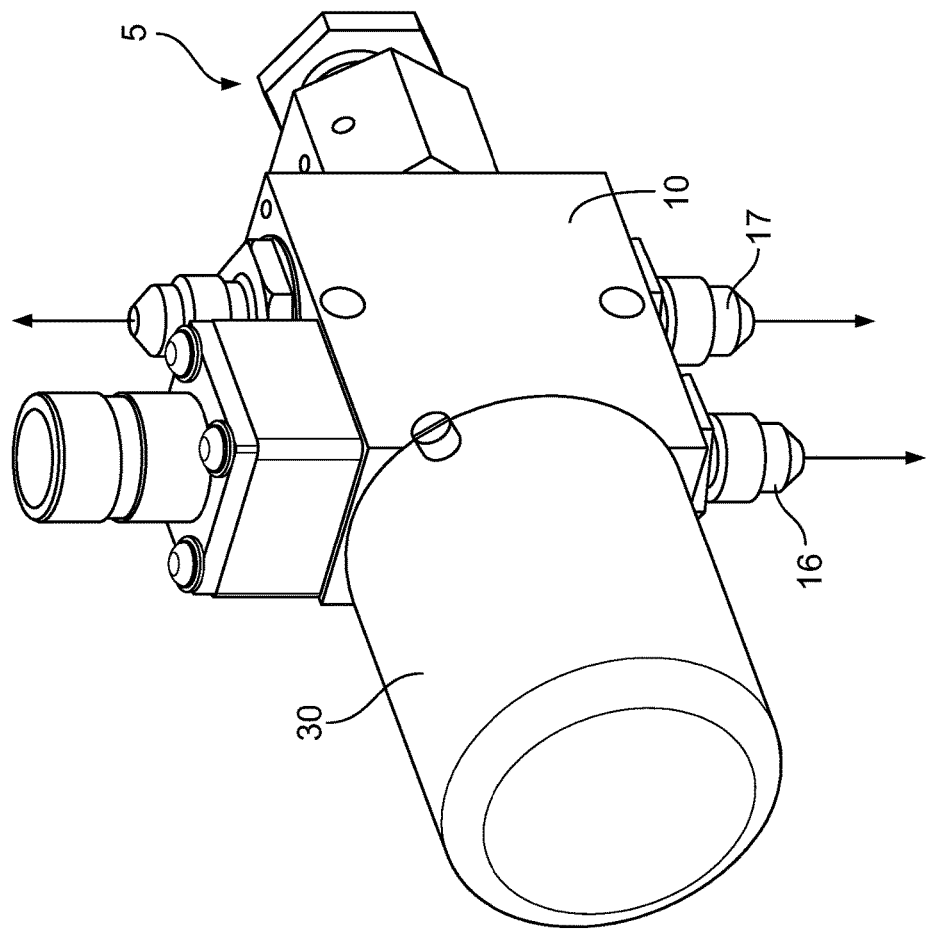
FIG. 14
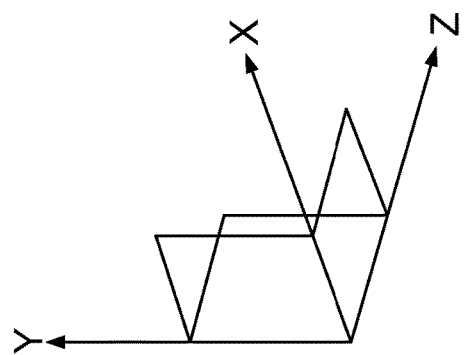

SOLENOID VALVES FOR HIGH VIBRATION ENVIRONMENTS

BACKGROUND OF THE INVENTION

The present invention generally relates to solenoid operated valves, and more particularly to solenoid operated valves having guards to limit metal-metal contact to prolong the working life of the valve.

Solenoid operated valves are useful in many industrial applications and offer a number of advantages over traditional mechanical valves. Automotive uses can involve environments subject to high and prolonged levels of vibration. Aeronautical devices such as rockets often involve exceptionally high levels of vibration and may require that the valves be subject to numerous uses before replacement. These types of environments can lead to failure of certain aspects of a solenoid operated valve, which in turn can negatively impact or prevent the use of the device in which the valve is employed.

There remains room for improvement in the design and use of solenoid operated valves, particularly with regard to the ability of such valves to withstand high and prolonged levels of vibrations while preventing failure when subjected to such high-dynamic environments.

BRIEF SUMMARY OF THE INVENTION

A first aspect of the present invention is a solenoid operated valve including a valve block defining a valve lumen, a poppet slidably disposed within the valve lumen, a solenoid including a core defining a core lumen aligned with the valve lumen, an armature assembly including an armature disc, an armature guide having a hollow cylindrical body defining an armature guide passage, and an armature stud disposed within the armature guide passage, wherein the armature stud is in communication with the poppet so that axial movement of one is translated into axial movement of the other, a coil cover enclosing the solenoid, and a guard disposed to prevent contact between the armature assembly and an adjacent component of the valve.

In accordance with other embodiments of the first aspect, the adjacent component of the valve may be the coil cover, the core, or the poppet. The guard may be a guide ring disposed between the armature guide and the core. The guide ring may include a plurality of guide rings spaced apart along the armature guide. The plurality of guide rings may include two guide rings. The guide ring may be a split ring. The guide ring may be comprised of a polyimide material. An outer surface of the armature guide may include an annular recess in which the guide ring is disposed. An outer diameter of the guide ring in a resting state may be larger than an outer diameter of the armature guide.

The guard may be a bumper positioned between the armature stud and the coil cover. The bumper may be comprised of a polymer material. A screw may secure the bumper to the coil cover, and the bumper may maintain a space between the armature stud and the screw. The valve may further include a spring disposed between an inner surface of the bumper and the armature disc, wherein the bumper houses the spring.

The guard may be a shield positioned between the armature stud and the poppet. The shield may be a disc comprised of a polyimide material. The shield may be a disc held in place by a spring load on an opposing side of the armature assembly. The shield may be a disc having a diameter between 0.220 and 0.330 inches, inclusive, and a thickness between 0.040 and 0.060 inches, inclusive. The diameter of the disc may be 0.270 inches and the thickness of the disc may be 0.050 inches. The shield may be a wave spring configured to provide opposing forces between the armature assembly and the poppet. The shield may be a cylinder disposed about one end of the armature stud and extending out a distance beyond an end of the armature stud to prevent contact between the armature assembly and the poppet. The cylinder may be comprised of a polymer material.

A second aspect of the present invention is a solenoid operated valve including a valve block defining a valve lumen, a poppet slidably disposed within the valve lumen, a solenoid including a core defining a core lumen aligned with the valve lumen, an armature assembly including an armature disc, an armature guide having a hollow cylindrical body defining an armature guide passage, and an armature stud disposed within the armature guide passage, wherein the armature stud is in communication with the poppet so that axial movement of one is translated into axial movement of the other, a coil cover enclosing the solenoid, a guide ring disposed between the armature guide and the core, a bumper positioned between the armature stud and the coil cover, and a shield positioned between the armature stud and the poppet.

In accordance with other embodiments of the second aspect, the guide ring may include a plurality of guide rings spaced apart along the armature guide. The plurality of guide rings may include two guide rings. The guide ring may be a split ring. The guide ring may be comprised of a polyimide material. An outer surface of the armature guide may include an annular recess in which the guide ring is disposed. An outer diameter of the guide ring in a resting state may be larger than an outer diameter of the armature guide.

The bumper may be comprised of a polymer material. A screw may secure the bumper to the coil cover, and the bumper may maintain a space between the armature stud and the screw. The valve may further include a spring disposed between an inner surface of the bumper and the armature disc, wherein the bumper houses the spring.

The shield may be a disc comprised of a polyimide material. The shield may be a disc held in place by a spring load on an opposing side of the armature assembly. The disc may have a diameter between 0.220 and 0.330 inches, inclusive, and a thickness between 0.040 and 0.060 inches, inclusive. The diameter of the disc may be 0.270 inches and the thickness of the disc may be 0.050 inches. The shield may be a wave spring configured to provide opposing forces between the armature assembly and the poppet. The shield may be a cylinder disposed about one end of the armature stud and extending out a distance beyond an end of the armature stud to prevent contact between the armature assembly and the poppet.

A third aspect of the present invention is a method of assembling a solenoid operated valve, the valve including a valve block defining a valve lumen, a poppet slidably disposed within the valve lumen, a solenoid including a core defining a core lumen aligned with the valve lumen, and an armature assembly having an armature disc, an armature guide having a hollow cylindrical body defining an armature guide passage, and an armature stud disposed within the armature guide passage, the method including the steps of placing a shim between the armature disc and the core to increase a distance between the armature disc and the core by a thickness of the shim, pressurizing the valve with the shim between the armature disc and the core, energizing the valve with the shim between the armature disc and the core, and increasing a load on an energized annular seat of the valve lumen by advancing the armature stud toward the energized annular seat to force the poppet into contact with the energized annular seat.

In accordance with other embodiments of the third aspect, the method may further include the step of recording leakage at the energized annular seat after the step of pressurizing the valve and before the step of energizing the valve. The step of energizing may not cause the armature stud to contact the poppet. The step of increasing the load may be performed until no leakage occurs at the energized annular seat. The method may further include the steps of de-energizing the valve and removing the shim. The method may further include the step of coining the energized annular seat by performing a cycle of energizing and de-energizing the valve at least ten times. The method may further include the steps of placing a secondary shim between the armature disc and the core, the secondary shim having a thickness less than the thickness of the shim, energizing the valve with the secondary shim between the armature disc and the core, and observing whether any leakage occurs at the energized annular seat of the valve lumen.

Before the step of placing the shim, the method may further include the steps of initially pressurizing the valve, and increasing the load on a de-energized annular seat of the valve lumen by advancing the poppet into contact with the de-energized annular seat. The step of initially pressurizing the valve may not cause the poppet to contact the armature stud. The method may further include the step of recording leakage at the de-energized annular seat after the step of initially pressurizing the valve and before the step of increasing the load on the de-energized annular seat. The step of increasing the load on the de-energized annular seat may include threading a screw to contact the poppet.

The step of placing the shim may include placing multiple shims sequentially between the armature disc and the core. The step of placing the shim may include placing multiple shims simultaneously between the armature disc and the core. The step of advancing the armature stud may include threading the armature stud through the armature guide.

BRIEF DESCRIPTION OF THE DRAWINGS

FIGS. 1A and 1B are respective enlarged views of portions of the sectional plan view of FIG. 1.

FIGS. 8A and 8B are perspective views of a bumper screw of the solenoid operated valve shown in FIG. 1.

FIG. 9 is a perspective view of a disc of the solenoid operated valve shown in FIG. 1.

FIG. 13 is a table detailing test results of the solenoid operated valves in accordance with the various embodiments of the present invention.

FIG. 14 is a representation of valve 5 subject to testing among axes X, Y, and Z.

DETAILED DESCRIPTION

Figure 1:
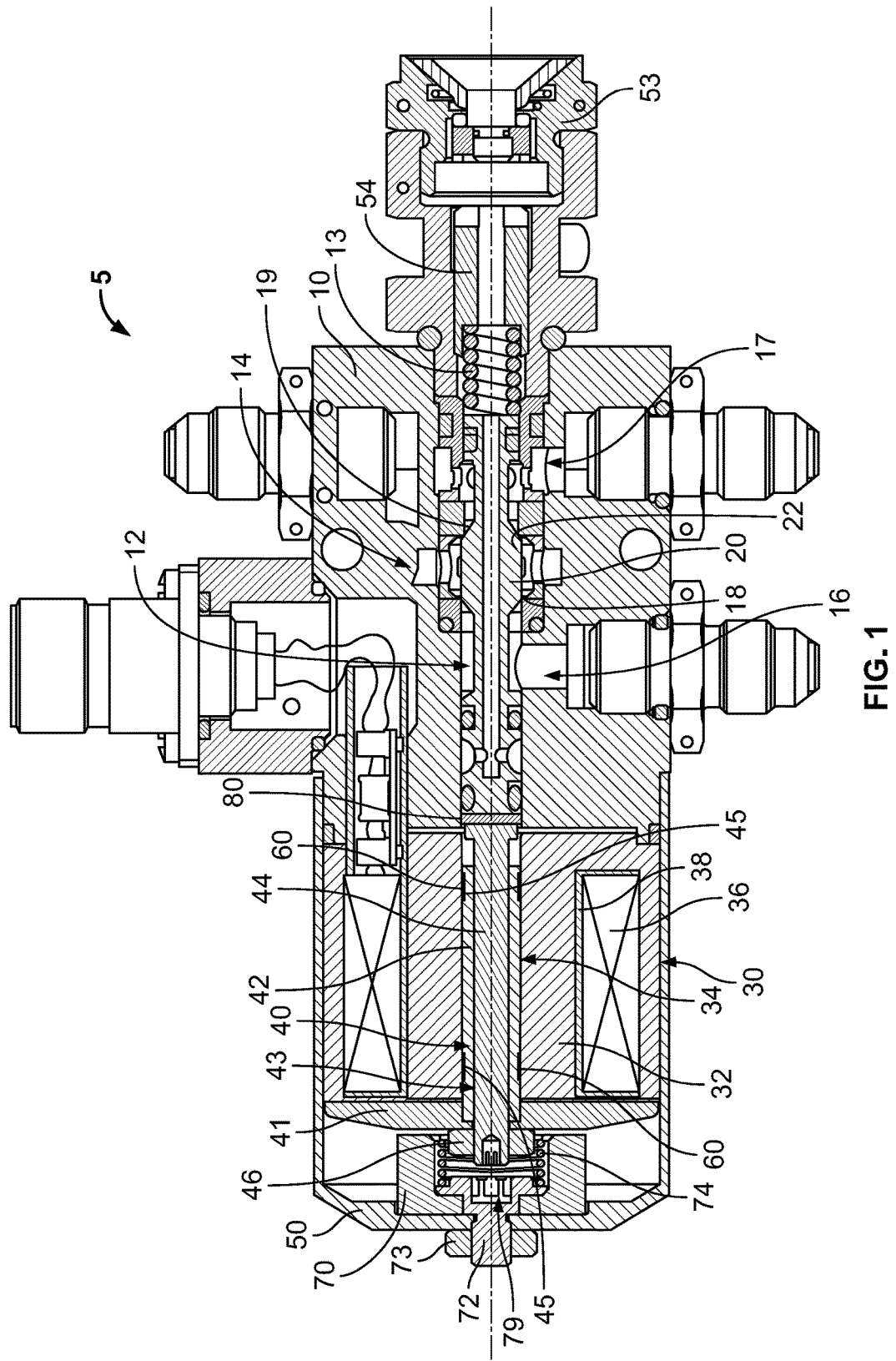
FIG. 1 is a sectional plan view of a solenoid operated valve in accordance with a first embodiment of the present invention.
Figure 1B:
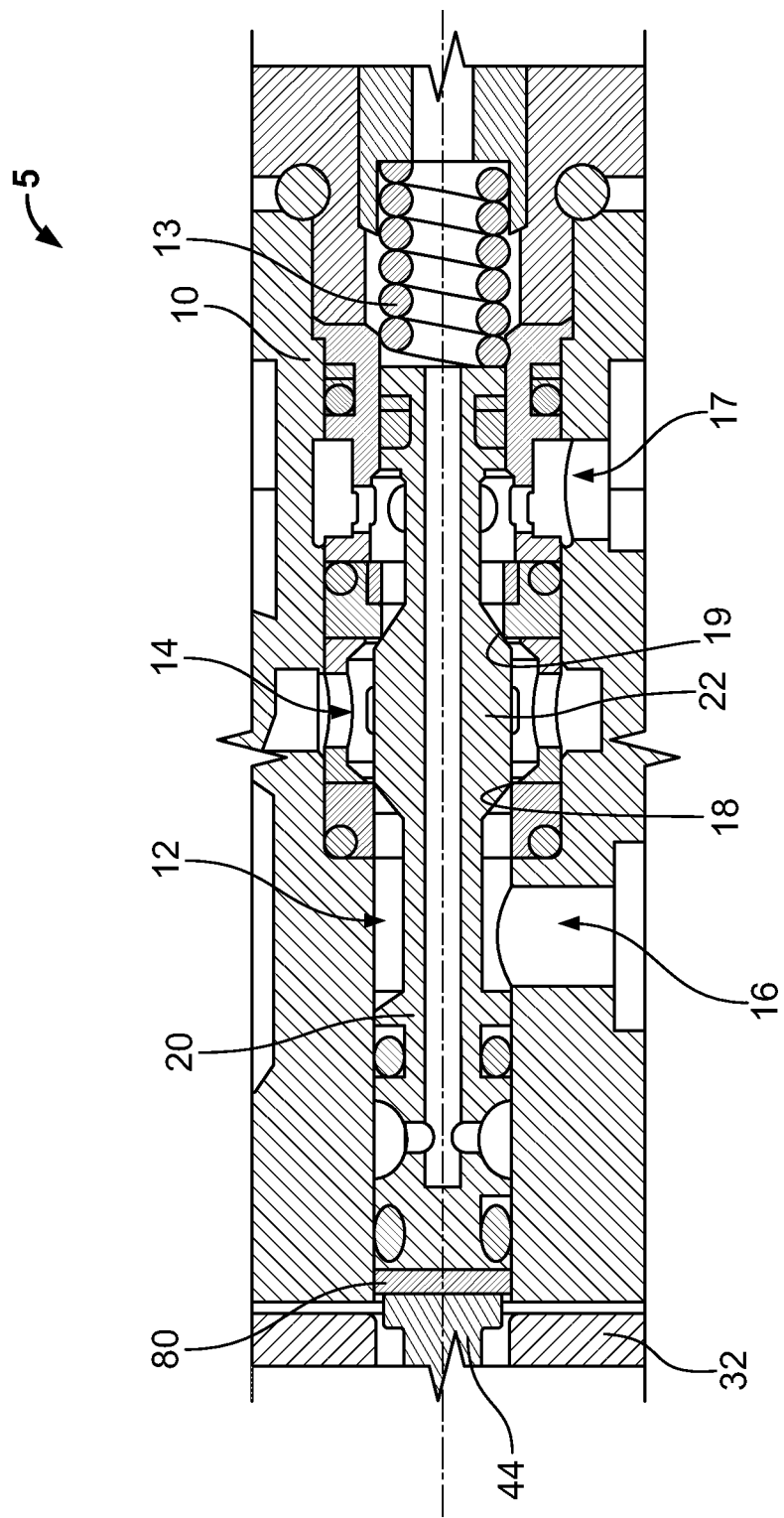
Figure 2:
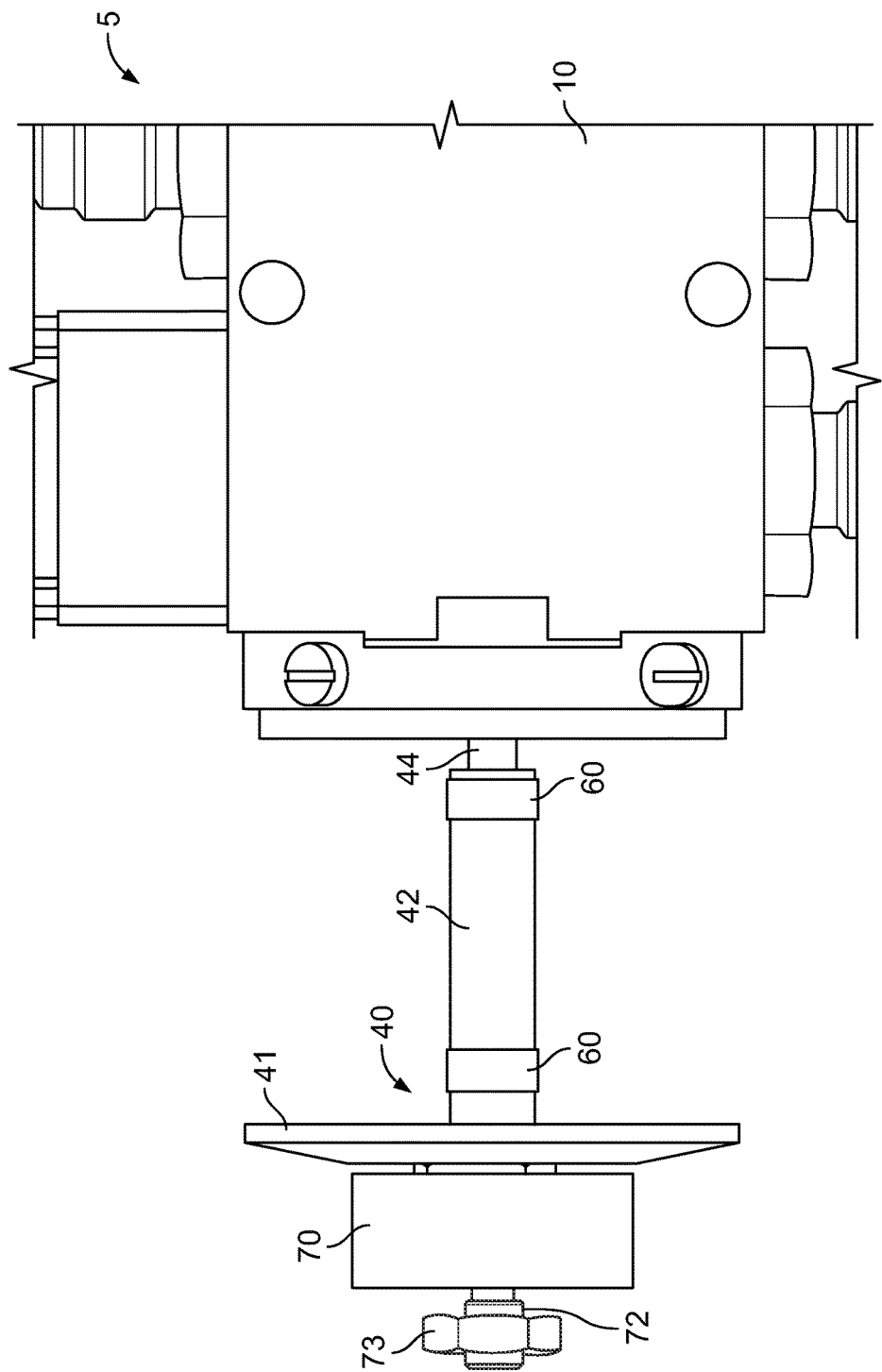
FIGS. 2 and 3 are respective enlarged plan views of certain features of the solenoid operated valve shown in FIG. 1.
Figure 3:
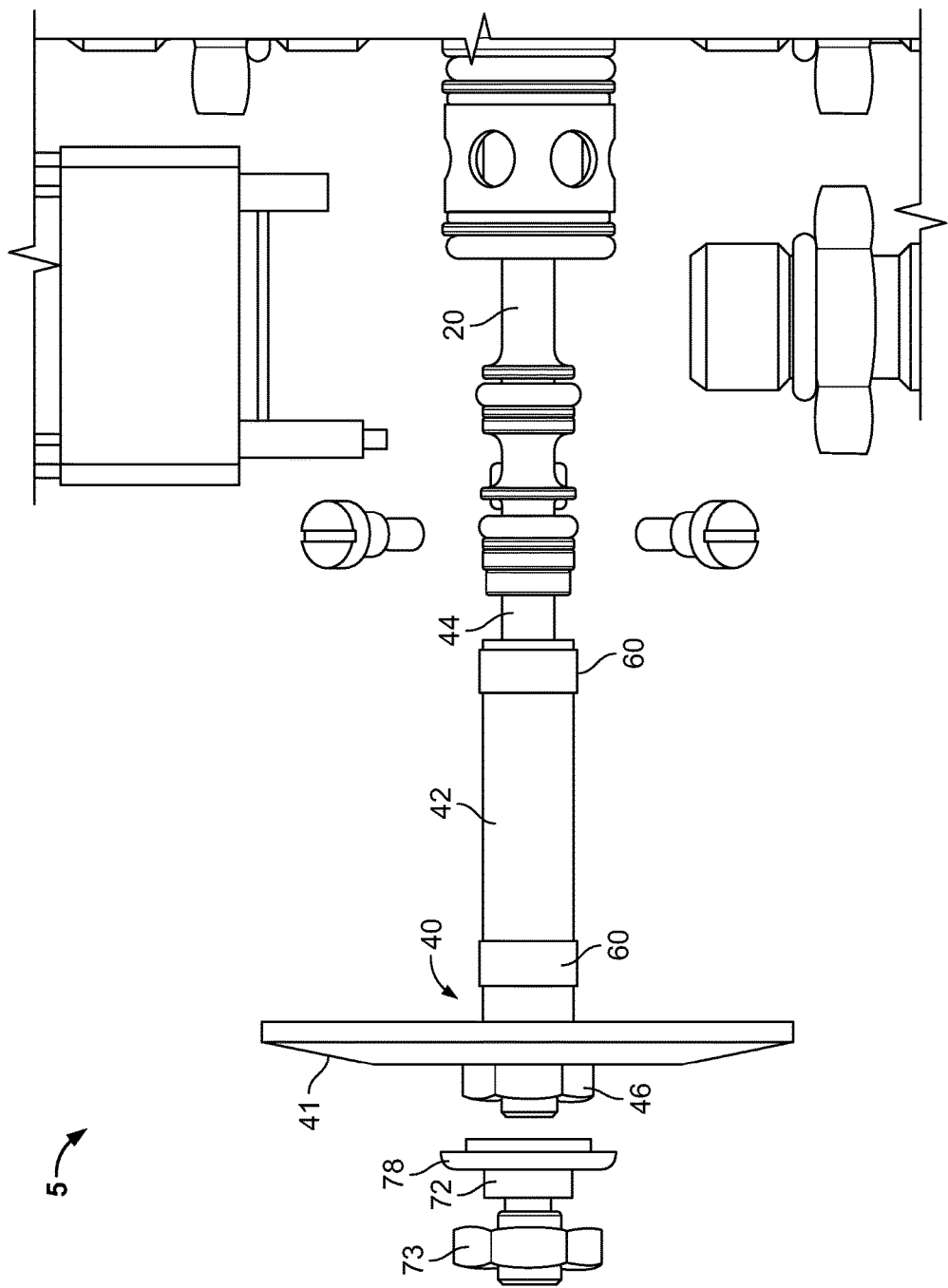
Figure 4:
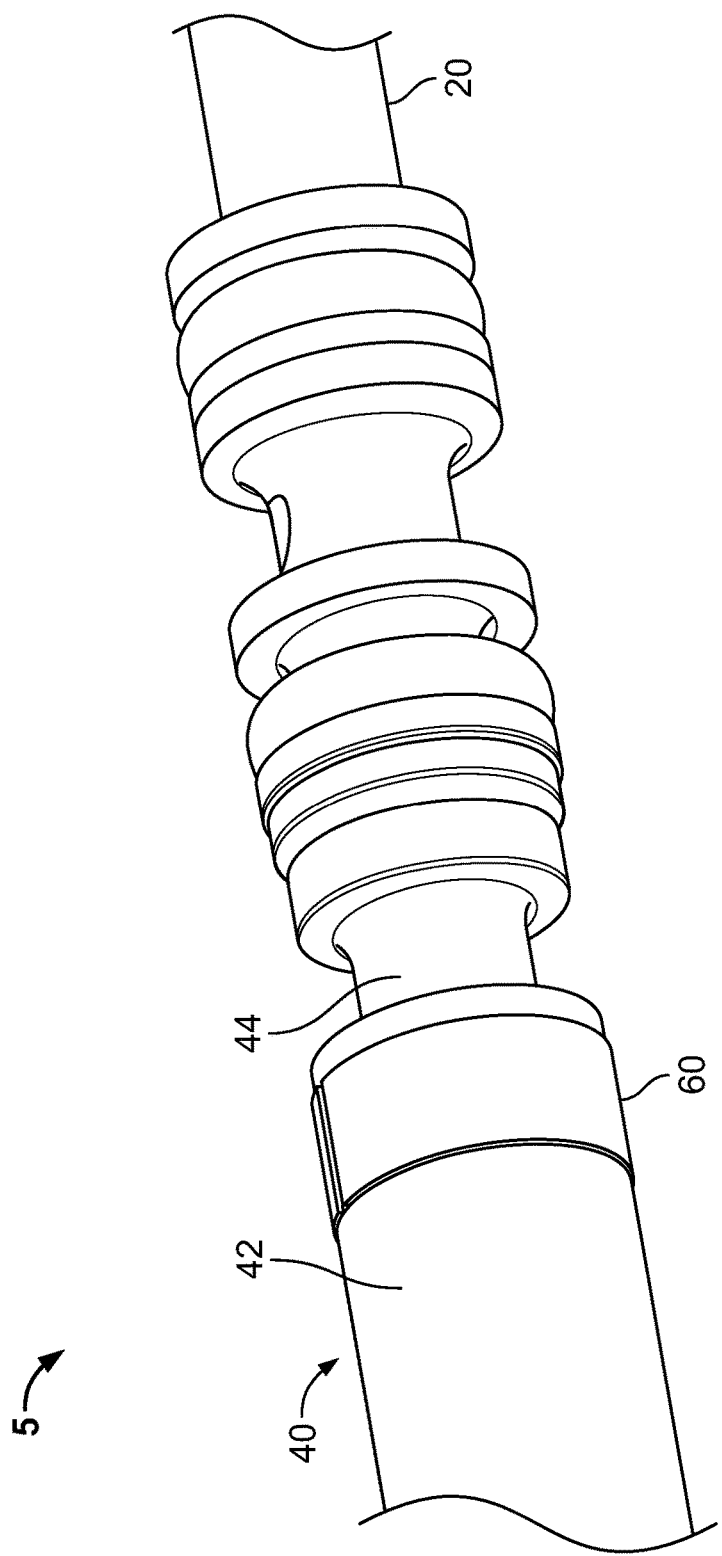
FIGS. 4 and 5 are respective enlarged perspective views of certain features of the solenoid operated valve shown in FIG. 1.
Figure 5:
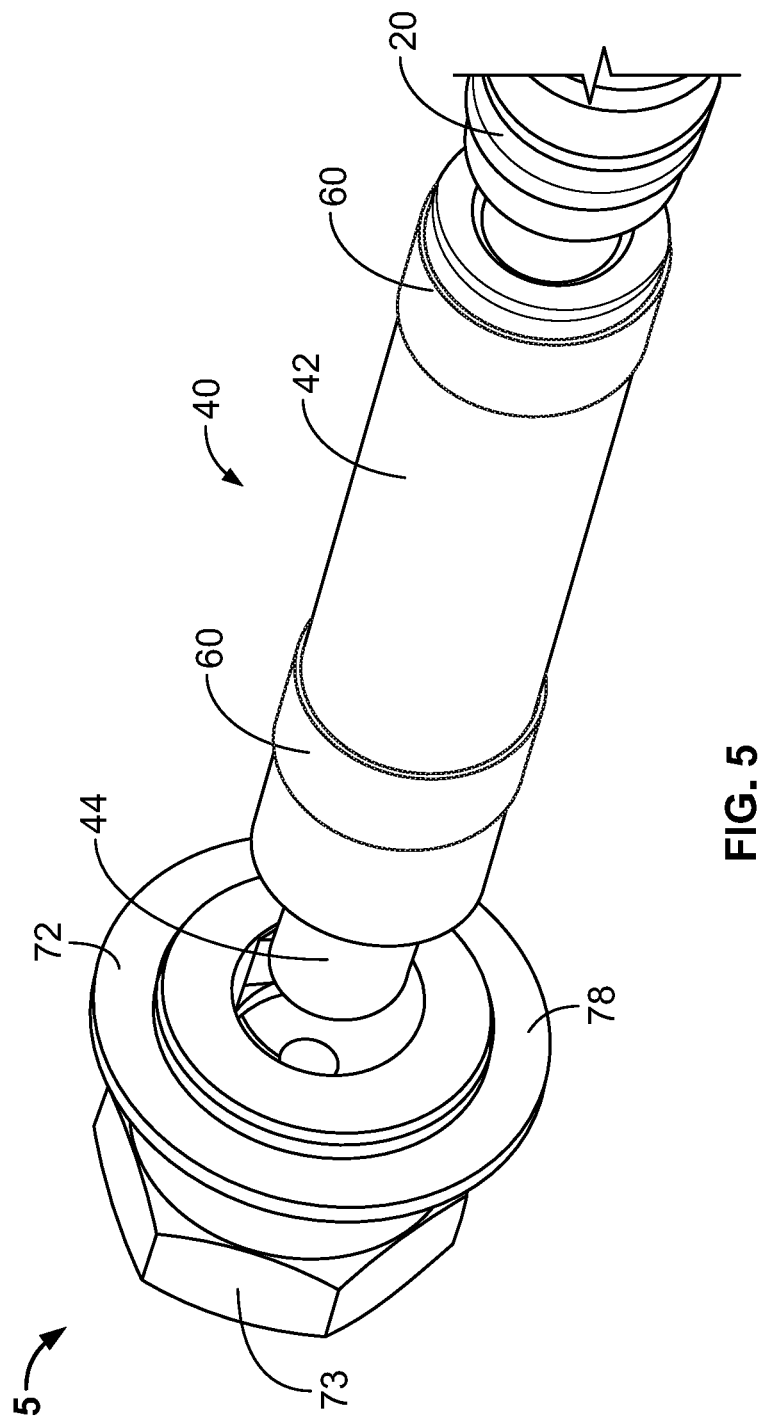

Shown in FIGS. 1-9 is a first embodiment of a solenoid operated valve 5 that includes a valve block 10, a poppet 20, a solenoid 30, and an armature assembly 40. Valve block 10 defines a lumen 12 in which poppet 20 is slidably disposed to move back and forth. An inlet 14 of valve block 10 leads to a first seat 18 and a second seat 19, both of which are annular surfaces of valve block 10 that encircle lumen 12.

Poppet 20 can be moved to different positions in which an enlarged portion 22 thereof is pressed against one of first and second seats 18, 19 to seal that seat and effectively open the other. In the context of the view of FIG. 1, when a force moves poppet 20 to the right, enlarged portion 22 of poppet 20 engages second seat 19, thus opening an annular space and passage at first seat 18 so that a passage extends from inlet 14 to a first outlet 16. Conversely, when a force moves poppet to the left, enlarged portion 22 of poppet 20 engages first seat 18, thus opening an annular space and passage at second seat 19 so that a passage extends from inlet 14 to a second outlet 17. The distance poppet 20 moves between engagement of first and second seats 18, 19 is about ten thousandths of an inch, though different configurations and sizes of similar solenoid operated valves can have different lengths of poppet movement. A spring 13 naturally biases poppet 20 against first seat 18, and this position is shown in FIG. 1. The force of spring 13 is counterbalanced by a force provided by armature assembly 40, as discussed below.

As shown in FIG. 1, solenoid 30 is located adjacent valve block 10 and includes a core 32 defining a lumen 34 that is aligned with lumen 12 of valve block 10. Solenoid 30 also includes windings 36 and a bobbin 38. A coil cover 50 encloses solenoid 30 and is securely, fixedly connected with valve block 10 by inserting screws through coil cover 50 and into valve block 10.

Armature assembly 40 includes an armature disc 41, an armature guide 42 having a hollow cylindrical body defining a passage 43, and an armature stud 44 disposed within passage 43, which are shown in FIGS. 1-5. Armature stud 44 is in communication with poppet 20 so that axial movement of one can be translated into axial movement of the other within the pair of lumens 12 and 34. More specifically, movement of armature stud 44 toward poppet 20 generates corresponding movement of poppet 20. Movement of armature stud 44 away from poppet 20 does not actively pull poppet 20 in the same direction, though spring 13 supplies the force to push poppet 20 accordingly. Armature assembly 40 and poppet 20 are disconnected (i.e. two separate pieces as opposed to one monolithic piece) to prevent misalignment of poppet 20 on first and second seats 18, 19. Armature guide 42 has one end away from poppet 20 fixedly connected within a recess of armature disc 41. Armature stud 44 extends through armature disc 41 to further secure the components of armature assembly 40 together by way of a nut 46 that rests against armature disc 41. In this way, armature disc 41, armature guide 42, armature stud 44, and nut 46 all move together as one integral construct. When an electrical current is passed through windings 36, an electromagnetic field is generated around solenoid 30 which attracts armature disc 41 to core 32.

Valve 5 is designed for use in high vibration environments, particularly ones that require reuse of valve 5 during multiple iterations of the environment. Accordingly, various embodiments of valve 5 include different design features or guards that limit metal-metal contact between certain components of valve 5, such as between armature assembly 40 and coil cover 50, between armature assembly 40 and core 32, and/or armature assembly 40 and poppet 20, in order to prolong the life and prevent failure of valve 5 when it is subjected to such high-dynamic environments.

Figure 6:
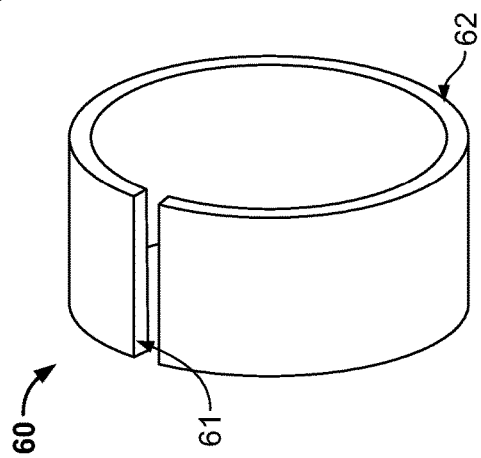
FIG. 6 is a perspective view of a ring of the solenoid operated valve shown in FIG. 1.

A first of these guards is a guide ring 60, as shown in FIG. 6. Ring 60 has a flat, annularly shaped body having a split or gap 61 such that it does not form a complete annulus. Ring 60 is comprised of a polyimide material. Materials of which ring 60 can be made are polymers that exhibit good wear and have a low coefficient of friction, including but not limited to polyimide, PEEK (Polyetheretherketone), PTFE (Polytetrafluoroethylene), and FEP (Fluorinated ethylene propylene). Glass-filled and carbon-filled versions of these materials can also be utilized. Ring 60 can therefore accommodate some stress so that it can be flexed to temporarily enlarge its inner diameter. This permits assembly of ring 60 into valve 5.

As shown in FIGS. 1-5, valve 5 includes two rings 60 that are disposed between armature guide 42 and core 32 of solenoid 30 to prevent contact and wear therebetween. Rings 60 are seated within annular depression or recesses 45 formed in the outer surface of armature guide 42 to maintain their positioning during use of valve 5. When in a resting state, ring 60 has an outer diameter that is larger than an outer diameter of armature guide 42. Put another way, ring 60 has a radial thickness 62 that is constant and that is greater than a depth of recess 45 measured from the outer diameter of armature guide 42. In this way, rings 60 protrude from recesses 45 to interface with an interior surface of lumen 34 of core 32 when the armature guide 42-ring 60 construct is provided therein. Rings 60 therefore shield contact between armature guide 42 and core 32. The material of rings 60 has low friction and good wear properties. When in its resting state, ring 60 has an inner diameter that is about the same as or slightly smaller than an outer diameter of recess 45 of armature guide 42, thus ensuring a snug fit therebetween. In use, rings 60 prevent substantially all contact between armature guide 42 and core 32 of solenoid 30 during translational movement of the armature guide 42-ring 60 construct within lumen 34 of core 32.

Figure 7:
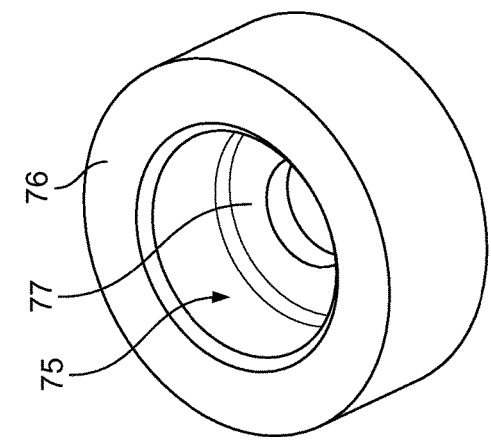
FIG. 7 is a perspective view of a bumper of the solenoid operated valve shown in FIG. 1.

A second type of guard is a bumper 70, as shown in FIG. 7. Bumper 70 has an annular body having a first portion 76 with a first thickness, and a recess 75 extending in from one wall of bumper 70 to define a second portion 77 with a smaller second thickness. Bumper 70 is positioned between armature stud 44 and coil cover 50 to prevent metal-metal contact therebetween and to limit the amount of movement of armature assembly 40. That is, the presence of bumper 70 reduces the unused stroke of armature assembly 40 by eliminating unuseful movement of armature assembly 40 and reducing energy built up in armature assembly 40. Bumper 70 is comprised of a polymer material, such as Fluorinated ethylene propylene or FEP. Other materials, such as those discussed above in connection with ring 60, can also be utilized to construct bumper 70.

Figure 8A:
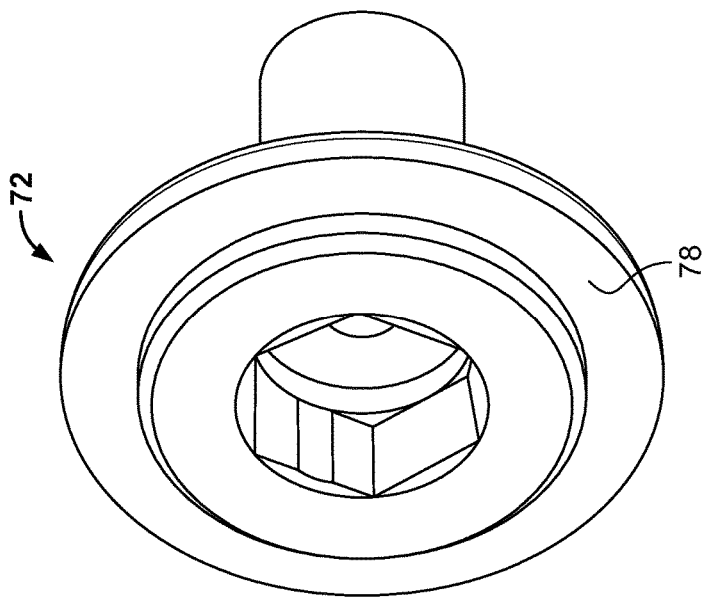

As shown in FIGS. 1-3 and 5, bumper 70 is secured to coil cover 50 by a bumper screw 72, which is in turn secured to coil cover 50 by a nut 73. Screw 72 is shown in FIGS. 8A and 8B and is configured with a flange 78 that fits into recess 75 of bumper 70 to sandwich second portion 77 of bumper against an inner surface of coil cover 50. A relief 79 is provided within screw 72 to prevent contact with armature stud 44 upon extreme movement of armature stud 44. In embodiments in which bumper 70 and screw 72 are not provided, it is possible that such extreme movement of armature assembly 40 results in damage to coil cover 50. In embodiments employing a screw such as screw 72 to limit movement of armature assembly 40 but omitting bumper 70, it remains possible that movement of armature assembly 40 can damage such screw. Accordingly, bumper 70 and screw 72 are designed to accommodate excess movement of armature assembly 40 while preventing or alleviating damage to internal components of valve. The presence of bumper 70 therefore provides and maintains a space between armature stud 44 and screw 72 to prevent metal-metal contact therebetween. Bumper 70 also absorbs energy from armature assembly 40 and dissipates such energy through heat.

As shown in FIG. 1, a spring 74 is disposed within a recess 75 of bumper to provide and maintain a force between an inner surface of bumper 70 and armature disc 41, which biases armature assembly 40 toward poppet 20. Because of the fixed connection between coil cover 50 and valve block 10, this force along with that provided by spring 13 maintains contact between armature assembly 40 and poppet 20. In some instances, this contact can be direct, while in others it can be via another guard such as a disc 80 as described below. Nonetheless, direct or indirect contact between armature assembly 40 and poppet 20 is maintained. When valve 5 is at rest, the force provided by spring 13 overrides that provided by spring 74 to move armature assembly 40 and poppet 20 toward coil cover 50.

A third type of guard is a shield positioned to eliminate metal-metal contact between armature stud 44 and poppet 20. As shown in FIG. 9, the shield is a disc 80 that has a thin cylindrical body. Disc 80 is relatively thin and stiff, and is held in place by the load provided by springs 13 and 74. In one embodiment, disc has a diameter of 0.270 inches and a thickness of 0.050 inches. In certain embodiments, the diameter of disc 80 can be between 0.250 and 0.300 inches, and in other embodiments, such range can be between 0.220 and 0.330 inches. Other ranges are also acceptable as accommodated by the internal diameters of lumens 12 and 34. In certain embodiments, the thickness of disc 80 can be between 0.045 and 0.055 inches, and in other embodiments, such range can be between 0.040 and 0.060 inches. Other ranges are also acceptable based on the space available between armature stud 44 and poppet 20. Disc 80 is comprised of a polyimide material. Other materials, such as those discussed above in connection with ring 60, can also be utilized to construct disc 80.

Figure 10:
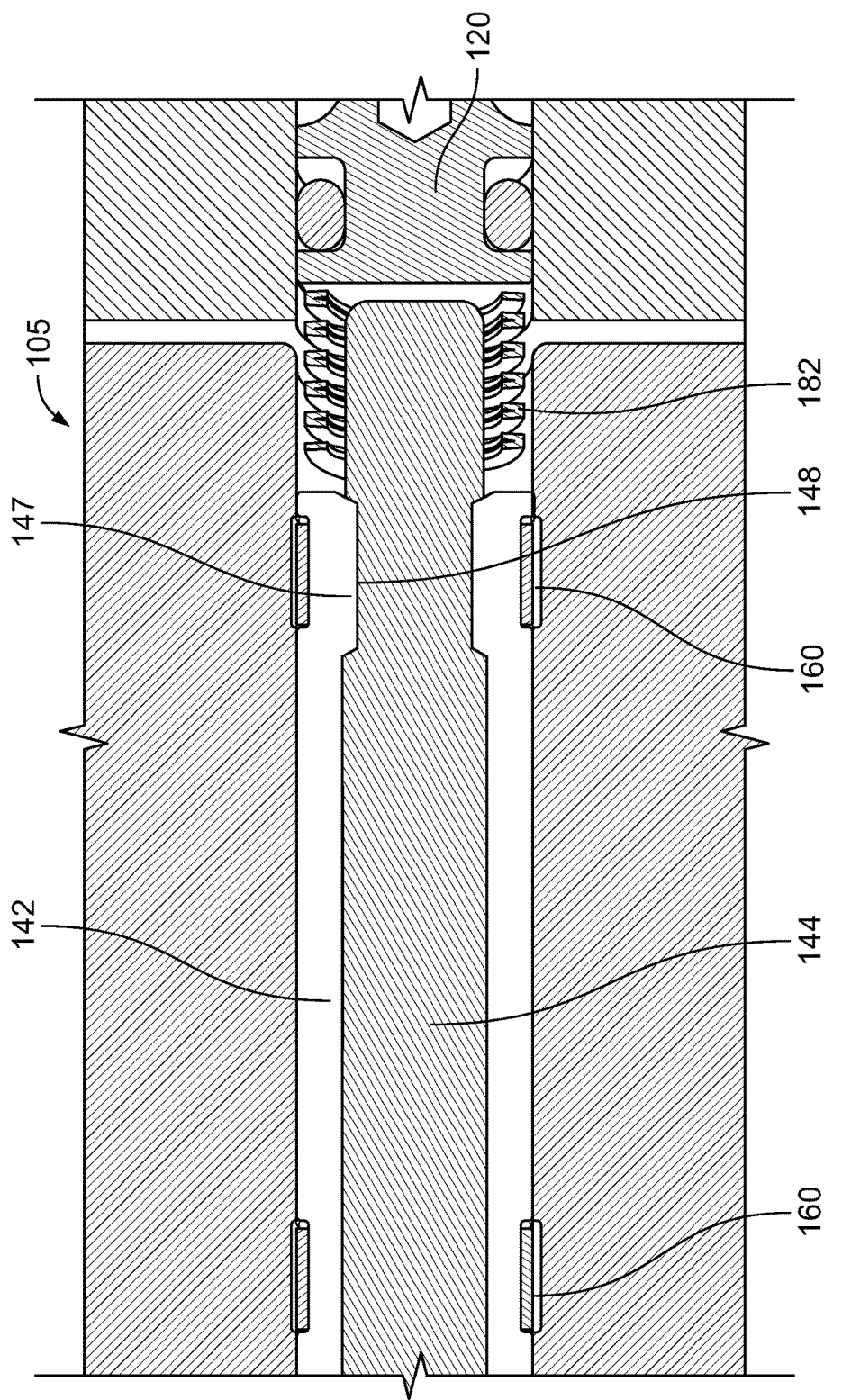
FIG. 10 is an enlarged sectional plan view of a solenoid operated valve having a leaf spring in accordance with a second embodiment of the present invention.

In another embodiment shown in FIG. 10, a solenoid operated valve 105 is similar in nature to valve 5 with like elements numbered similarly. Valve 105 includes a light wave spring 182 as the shield, which is disposed about an end of armature stud 144 and against surfaces of armature guide 142 and poppet 120. In this embodiment, armature guide 142 includes an annular extension 147 that fits into an annular recess 148 of armature stud 144 in order to fix armature guide 142 and armature stud 144 together for translational movement. Wave spring 182 is configured to provide a force between surfaces of armature guide 142 and poppet 120 to substantially prevent contact between armature stud 144 (via its connection with armature guide 142) and poppet 120 when valve 105 is at rest. In comparison with valve 5, wave spring 182 replaces disc 80 and obviates spring 74, since wave spring 182 provides and maintains a force between an inner surface of the bumper and the armature disc that is provided by spring 74 in valve 5. Thus, the bumper is held against the armature disc due to the force provided by wave spring 182.

Figure 11:
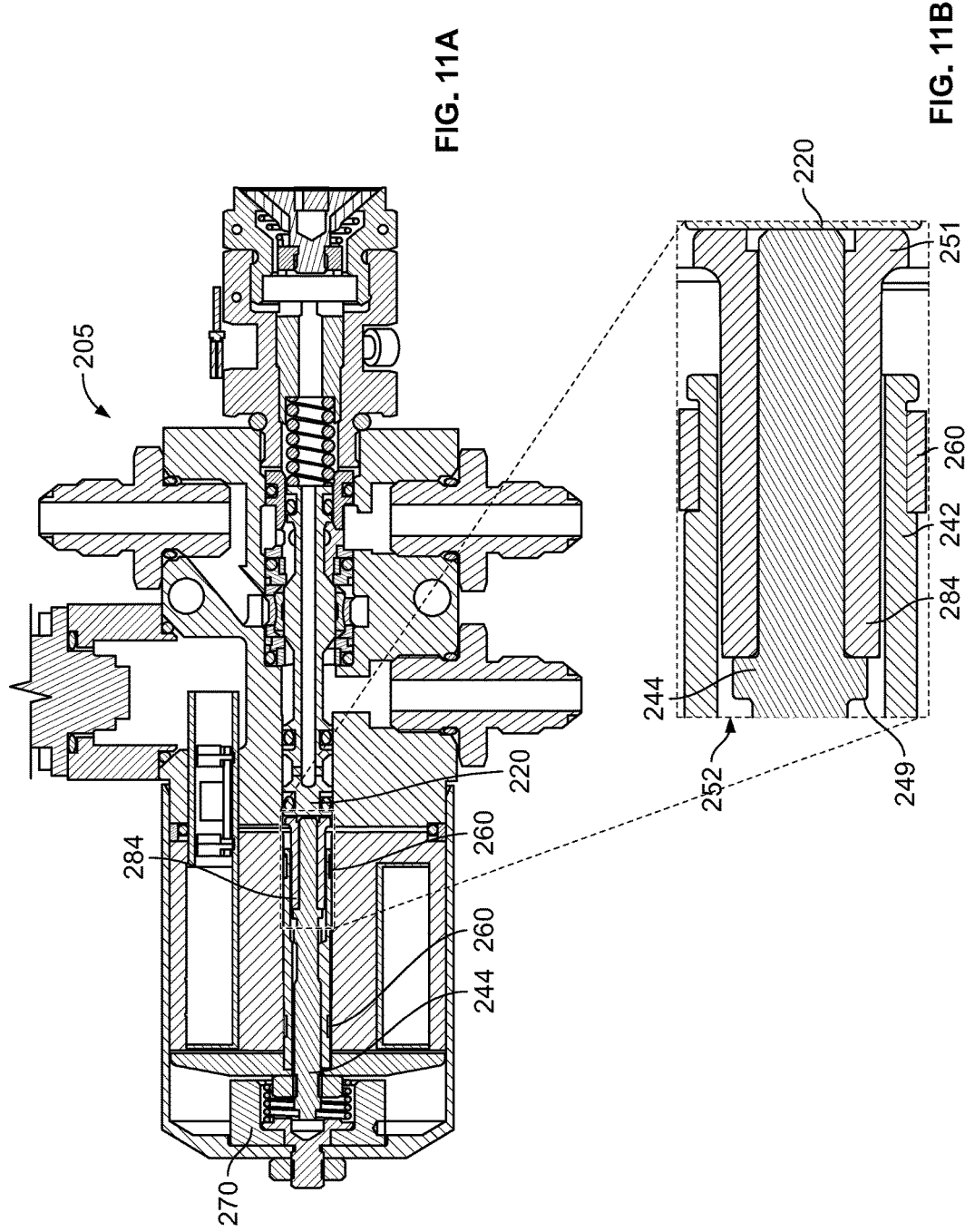
FIGS. 11A and 11B are enlarged sectional plan views of a solenoid operated valve having a cylinder in accordance with a third embodiment of the present invention.

Another embodiment is shown in FIGS. 11A and 11B of a solenoid operated valve 205 similar in nature to valve 5 with like elements numbered similarly. Valve 205 includes a cylinder 284 as the shield, which is pressed onto and disposed about an end of armature stud 244 and extends out a distance beyond an end of armature stud 244 to contact poppet 220. Cylinder 284 is tubular and behaves similarly to wave spring 182 and biases armature stud 244 away from the poppet 220. Armature stud 244 includes an annular flange 249 against which an end of cylinder 284 is seated. Cylinder 284 includes a flared flange 251 at the end facing poppet 220 to increase the surface area through which it contacts poppet 220. A length of cylinder 284 is preferably longer than a length of armature stud 244 from this seated surface of flange 249 to the end of armature stud 244 that contacts poppet 220. In this way, cylinder 284 is designed to contact poppet 220 so that armature stud 244 does not. Cylinder 284 is comprised of a polyimide material, which allows it to yield under certain magnitudes of force. Other materials, such as those discussed above in connection with ring 60, can also be utilized to construct cylinder 284. Thus, when armature stud 244 is moved toward poppet 220, cylinder 284 is configured to provide a force between surfaces of armature guide 242 and poppet 220 to substantially prevent contact between armature stud 244 (via its connection with armature guide 242) and poppet 220 when valve 205 is at rest. In this way, cylinder 284 acts as a buffer or a spring to eliminate contact between armature stud 244 and poppet 220. Because cylinder 284 is provided on armature stud 244, armature guide 242 includes an enlarged internal recess 252 at the end facing poppet 220 to accommodate cylinder 284. Cylinder 284 also replaces disc 80 and obviates spring 74, since it provides and maintains a force between an inner surface of the bumper and the armature disc that is provided by spring 74 in valve 5. Thus, the bumper is held against the armature disc due to the force provided by cylinder 284.

In addition to those embodiments of valves 5, 105, 205 described above and depicted in the figures, solenoid operated valves according to the present invention can incorporate different numbers of the various guards alone or in combination to achieve the purpose of limiting metal-metal contact between certain components thereof. As in valve 5, two rings 60, one bumper 70, and one disc 80 can be provided as guards. More or fewer rings 60 can be located along armature guide 42 based on design and particular use of the valve. Additional discs 80 can also be employed in a stacked configuration. In another embodiment, a valve may include only one or more rings as a guard. In another embodiment, a valve may include only a bumper as a guard. In yet another embodiment, a valve may include only one or more discs as a guard. Another embodiment of a valve may include only one or more rings and a bumper as a guard. Another embodiment of a valve may include only one or more rings and one or more discs as a guard. Still another embodiment of a valve may include only a bumper and one or more discs as a guard.

As in valve 105, wave spring 182, two rings 160, and one bumper can be provided as guards. More or fewer rings 160 can be provided. In another embodiment, a valve may include only one wave spring as a guard. Another embodiment of a valve may include only one or more rings and one wave spring as a guard. Another embodiment of a valve may include only a bumper and one wave spring as a guard.

As in valve 205, cylinder 284, two rings 260, and one bumper 270 can be provided as guards. More or fewer rings 260 can be provided. In another embodiment, a valve may include only one cylinder a guard. Another embodiment of a valve may include only one or more rings and one cylinder as a guard. Another embodiment of a valve may include only a bumper and one cylinder as a guard.

When assembling a solenoid operated valve such as valve 5, the respective loads placed on first seat 18 and on second seat 19 should be set properly and should be balanced. In valve 5, first seat 18 is the de-energized seat, due to poppet 20 being biased against first seat 18 under the influence of spring 13 and absent a counter force that would otherwise be provided by armature assembly 40 when it is energized. Second seat 19 is the energized seat, due to poppet 20 being forced into contact with second seat 19 based on an energized armature assembly 40 overcoming the force of spring 13 and moving poppet 20 into contact with second seat 19. The forces applied to first and second seats 18, 19 are balanced to achieve a distribution of seat force margin onto the two seats. Here, the seat force margin is defined as the amount of force above the required amount of force that is necessary to maintain a non-leaking valve. The more seat force margin that is put onto each seat, the more robust the valve will be against foreign object debris, external environmental, etc. The forces or loads are balanced to prevent over coin of the plastic seats. Over coin is plastic deformation of the seat material that would cause unrepairable damage. Properly setting the respective force margins and balancing the respective loads on first and second seats 18, 19 can prolong the life of valve 5 by minimizing any uneven and overly burdensome forces on first and second seats 18, 19.

When initially assembled and with valve 5 de-energized, the forces exerted on poppet 20 are a force FS due to spring 13 pushing poppet 20 toward armature assembly 40, and a force FB due to spring 74 of bumper 70 acting in the opposite direction through armature assembly 40. In magnitude, force FB is negligible in comparison to force FS. Other forces that are present include forces due to pressure from slightly unbalanced bores in which poppet 20 rides, though these potential forces are omitted during the following explanation. These forces FS and FB result in a force F1 applied by poppet 20 to first seat 18 equal to force FS minus force FB.

When valve 5 is energized, armature assembly 40 exerts a force FA on poppet 20. Force FA (aided by force FB) overcomes force FS provided by spring 13, and thus results in a force F2 applied by poppet 20 to second seat 19 equal to force FA plus force FB minus force FS.

One process of accurately capturing the seat load margin or force margin on de-energized first seat 18 involves incrementally increasing the load imposed onto first seat 18 while valve 5 is pressurized, actively recording leakage at first seat 18, and setting a five (5) pound reverse load in place.

Figure 12:
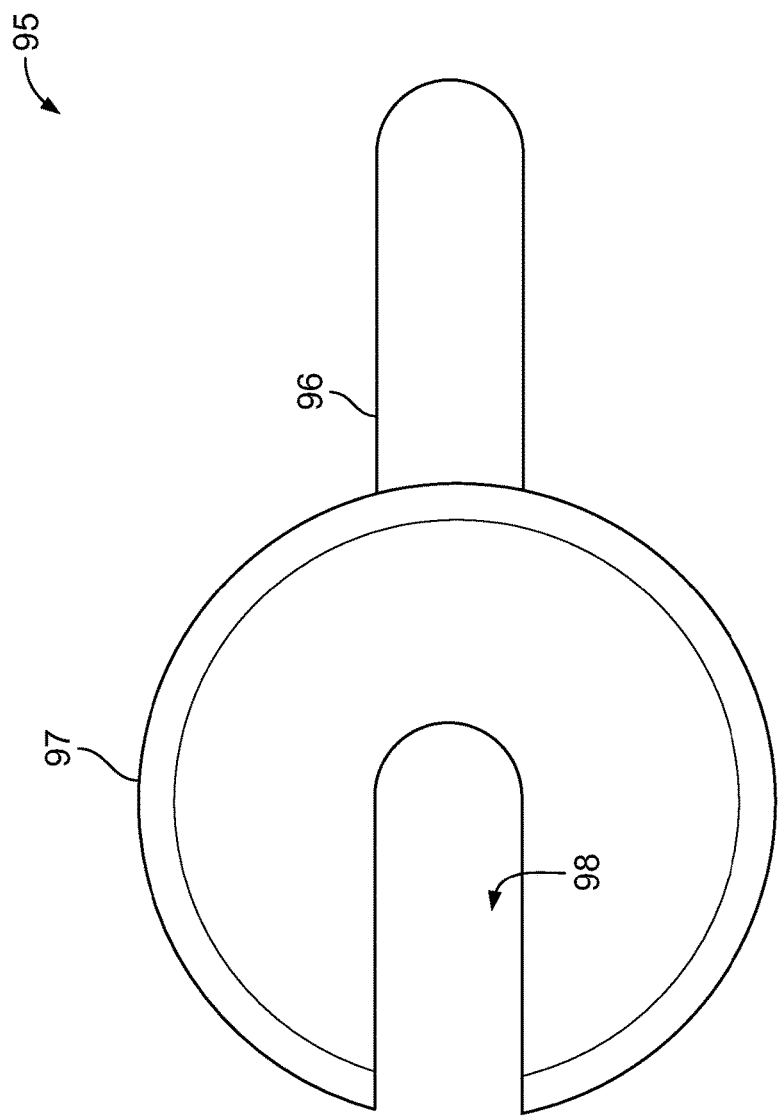
FIG. 12 is a top view of a shim used in connection the solenoid operated valves in accordance with the various embodiments of the present invention.

A method of assembling a solenoid operated valve 5 according to the present invention includes a process of accurately capturing the seat load margin or force margin on energized second seat 19. The method involves the use of one or more shims 95, as shown in FIG. 12, to ensure the proper force margin onto second seat 19. Each shim 95 is a thin, flat body having a tab 96 for manipulation by a user and a horseshoe-shaped portion 97 defining a slot 98. Shim 95 has a thickness of 0.003 inches, though other thicknesses can be used, such as 0.001 inches, 0.002 inches, 0.005 inches and other values in the range of 0.0005 to 0.010 inches. In certain embodiments, a kit can be provided with shims of various thicknesses in the range of 0.0005 and 0.010 inches.

A method of assembling valve 5 includes first loosely assembling all components of valve 5 except for coil cover 50 and a vent check 53. During this process, armature stud 44 is positioned by threading it through armature guide 42 such that it is not in contact with poppet 20 or disc 80. An adjusting screw 54, shown in FIG. 1, is positioned to barely contact spring 13 all while valve 5 is not energized. The load on de-energized first seat 18 is then set by pressurizing valve 5, actively recording the leakage past de-energized first seat 18, and slowly increasing the load on de-energized first seat 18 by turning adjusting screw 54 to compress spring 13 until the leakage at de-energized first seat 18 stops.

Next, the load on energized second seat 19 is set. This includes inserting a shim 95 between armature disc 41 and core 32 of solenoid 30. Holding tab 96, a user can place horseshoe-shaped portion 97 of shim 95 between armature disc 41 and core 32 to increase the distance therebetween. Such distance is also referred to as the stroke of the armature assembly 40. With shim 95 in place, valve 5 is pressurized and the leakage at energized second seat 19 is actively recorded. Valve 5 is energized such that shim 95 is sandwiched between armature disc 41 and core 32 of solenoid 30, but while avoiding contact between armature stud 44 and disc 80 or poppet 20. That is, a space is maintained between armature stud 44 and poppet 20. The load on energized second seat 19 is then slowly increased by threading armature stud 44 further into armature guide 42 until the leakage at energized second seat 19 stops. In other words, the load is increased until the seal at energized second seat 19 is complete or substantially prevents leakage. Valve 5 is then de-energized and shim 95 is removed.

Energized second seat 19 is then coined by cycling valve 5 ten times. With shim 95 removed from valve 5, energized second seat 19 is compressed by an additional thickness, i.e. 0.003 inches corresponding to the thickness of shim 95, during this procedure. This deformation is partially plastic deformation of second seat 19, such that second seat 19 will tend to "bounce back" after being compressed during further operation of valve 5. After this coining process, valve 5 is de-energized.

The margin of second seat 19 is then checked by installing a shim of lesser thickness, e.g., 0.001 inches. With the thinner shim positioned in the same place that shim 95 was in the description above, valve 5 is energized. Any leakage at second seat 19 is read. This procedure ensures that an adequate margin is set on energized second seat 19 so that wear of up to the thickness of the thinner shim, i.e. 0.0001 inches, can be tolerated during use while still avoiding leakage on energized second seat 19.

Since the threaded connection fixes and maintains armature stud 44 in this particular relationship with armature disc 41, energizing this fixed configuration of armature assembly 40 now results in force FA exerted by armature assembly 40 on poppet 20 that is slightly greater in magnitude than that which was measured when shim 95 was located between armature disc 41 and core 32. This incrementally increased force FA provides a force margin to the load imposed onto energized second seat 19 that is predictable based on the thickness of shim 95. That is, pressing poppet 20 against second seat 19 by passing armature assembly 41 further through the distance equal to the thickness of shim 95 allows a precalculated and verified force margin to be set for the energized valve 5 to eliminate or reduce leakage at second seat 19. Of course, this margin can be set to different levels through the use of multiple shims or shims of different thicknesses as required. The shims can be placed either sequentially or simultaneously to achieve a desired thickness. The use of shim 95 in this regard allows such a force margin to be set without imposing the entire force FA on second seat 19 during acceptance testing and calibrating phase of valve 5, which can prolong its lifetime. In this configuration of valve 5 with shim 95 removed, valve cycling and seat conditioning (conditioning second seat 19 with a maximum input load/distance) can be carried out. Shim 95 can later be replaced between armature disc 41 and core 32 so that additional leakage measurements can be taken. If, at the end of this process, no leakage is observed with shim 95 in place, valve 5 has actuation margin in the form of linear poppet 20 travel, i.e., there is excess travel (margin) beyond the travel required to seal. This procedure for setting up valves 5 yields more consistent units.

To verify that the seat load procedure has been properly implemented, a process can be utilized that involves testing the seat margin by applying an opposing load onto poppet 20 while valve 5 is pressurized and actively recording leakage.

FIG. 13 is a table quantifying the superior performance of solenoid operated valves such as those described herein. Test 1 involved a solenoid operated valve omitting any of the above-described guards that limit metal-metal contact within the valve. Test 2 involved a solenoid operated valve like valve 5 described above, having two rings 60, polymer bumper 70, and Polyimide disc 80. Test 3 involved a solenoid operated valve like valve 105 described above, having two rings 60, bumper 70, and light wave spring 182. Test 4 involved a solenoid operated valve like valve 205 described above, having two rings 60, bumper 70, and cylinder 284. The test conditions included mounting the respective valve to a test block on a shaker table. Under vibration in the vertical (Y) direction, gRMS (g) was calculated based off the acceleration data recorded from an accelerometer mounted to a table to which the valve was mounted. Axes X, Y, and Z are oriented as labeled in FIG. 14, depicted next to a representation of valve 5. The numeral "(1)" signifies accent levels, while the numeral "(2)" signifies decent levels. As shown in the data of the table of FIG. 13, the solenoid operated valve omitting any of the above-described guards (Test 1) resulted in failure after only 220 seconds. The solenoid operated valves like valves 5, 105, 205 (Tests 2-4) each operated for 1550 seconds without failure. With the only variables among Tests 1-4 being the omission or presence of the above-described guards that limit metal-metal contact within the valve, it is clear that the presence of such guards substantially increased performance of the associated solenoid operated valve in a high vibration environment.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:
1. A solenoid operated valve comprising:
a valve block defining a valve lumen;
a poppet slidably disposed within the valve lumen;
a solenoid including a core defining a core lumen aligned with the valve lumen;
an armature assembly including an armature disc, an armature guide having a hollow cylindrical body defin- ing an armature guide passage, and an armature stud disposed within the armature guide passage, wherein at least a portion of the armature guide and at least a portion of the armature stud are disposed within the core lumen, and wherein the armature stud is in communication with the poppet so that axial movement of one is translated into axial movement of the other;

a coil cover enclosing the solenoid; and a guide ring disposed between the armature guide and the core in a radial direction extending from a central axis of the armature guide passage, wherein the guide ring moves relative to the core when the armature guide moves within the core lumen.

2. The solenoid operated valve of claim 1, wherein the guide ring includes a plurality of guide rings spaced apart along the armature guide.

3. The solenoid operated valve of claim 1, wherein the guide ring is a split ring.

4. The solenoid operated valve of claim 1, wherein the guide ring is comprised of a polymer material.

5. The solenoid operated valve of claim 1, wherein an outer surface of the armature guide includes an annular recess in which the guide ring is disposed.

6. The solenoid operated valve of claim 1, wherein an outer diameter of the guide ring in a resting state is larger than an outer diameter of the armature guide.

7. The solenoid operated valve of claim 1, further comprising:
a bumper positioned between the armature stud and the coil cover; and
a shield positioned between the armature stud and the poppet.

8. The solenoid operated valve of claim 7, wherein the bumper is comprised of a polymer material.

9. The solenoid operated valve of claim 7, wherein a screw secures the bumper to the coil cover, and the bumper maintains a space between the armature stud and the screw.

10. The solenoid operated valve of claim 7, further comprising a spring disposed between an inner surface of the bumper and the armature disc, wherein the bumper houses the spring.

11. The solenoid operated valve of claim 7, wherein the shield is a disc is comprised of a polymer material.

12. The solenoid operated valve of claim 7, wherein the shield is a disc held in place by a spring load applied on a side of the armature assembly opposite the poppet.

13. The solenoid operated valve of claim 12, wherein the disc has a diameter between 0.220 and 0.330 inches, inclusive, and a thickness between 0.040 and 0.060 inches, inclusive.

14. The solenoid operated valve of claim 13, wherein the diameter of the disc is 0.270 inches and the thickness of the disc is 0.050 inches.

15. The solenoid operated valve of claim 7, wherein the shield is a wave spring configured to provide opposing forces between the armature assembly and the poppet.

16. The solenoid operated valve of claim 7, wherein the shield is a cylinder disposed about one end of the armature stud and extending out a distance beyond an end of the armature stud to prevent contact between the armature assembly and the poppet.

17. The solenoid operated valve of claim 7, wherein the bumper is comprised of an elastic material.

18. The solenoid operated valve of claim 7, wherein the shield is a solid cylindrical disc.

19. A solenoid operated valve comprising:
a valve block defining a valve lumen;
a poppet slidably disposed within the valve lumen;
a solenoid including a core defining a core lumen aligned with the valve lumen;
an armature assembly including an armature disc, an armature guide having a hollow cylindrical body defining an armature guide passage, and an armature stud disposed within the armature guide passage, wherein at least a portion of the armature guide and at least a portion of the armature stud are disposed within the core lumen, and wherein the armature stud is in communication with the poppet so that axial movement of one is translated into axial movement of the other;
a coil cover enclosing the solenoid; and
a plurality of guide rings disposed between the armature guide and the core in a radial direction extending from a central axis of the armature guide passage and spaced apart along the armature guide.

20. The solenoid operated valve of claim 19, wherein an outer surface of the armature guide includes a plurality of annular recesses in which the plurality of guide rings are disposed, respectively.

21. The solenoid operated valve of claim 19, further comprising:
a bumper positioned between the armature stud and the coil cover; and
a shield positioned between the armature stud and the poppet.

22. A solenoid operated valve comprising:
a valve block defining a valve lumen;
a poppet slidably disposed within the valve lumen;
a solenoid including a core defining a core lumen aligned with the valve lumen;
an armature assembly including an armature disc, an armature guide having a hollow cylindrical body defining an armature guide passage, and an armature stud disposed within the armature guide passage, wherein at least a portion of the armature guide and at least a portion of the armature stud are disposed within the core lumen, and wherein the armature stud is in communication with the poppet so that axial movement of one is translated into axial movement of the other;
a coil cover enclosing the solenoid; and
a guide ring disposed between the armature guide and the core in a radial direction extending from a central axis of the armature guide passage,
wherein an outer surface of the armature guide includes an annular recess in which the guide ring is disposed.

23. The solenoid operated valve of claim 22, further comprising:
a bumper positioned between the armature stud and the coil cover; and
a shield positioned between the armature stud and the poppet.

* * * * *